(12) United States Patent
Satou et al.

(10) Patent No.: US 9,778,084 B2
(45) Date of Patent: Oct. 3, 2017

(54) FLOW-RATE MEASUREMENT DEVICE

(71) Applicant: Panasonic Intellectual Property Management Co., Ltd., Osaka (JP)

(72) Inventors: Masato Satou, Nara (JP); Yuji Nakabayashi, Nara (JP); Hidetomo Nagahara, Kyoto (JP); Akihisa Adachi, Kyoto (JP); Aoi Watanabe, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/104,242

(22) PCT Filed: Jan. 7, 2015

(86) PCT No.: PCT/JP2015/000028
§ 371 (c)(1),
(2) Date: Jun. 14, 2016

(87) PCT Pub. No.: WO2015/105042
PCT Pub. Date: Jul. 16, 2015

(65) Prior Publication Data
US 2016/0377468 A1    Dec. 29, 2016

(30) Foreign Application Priority Data

Jan. 9, 2014  (JP) .................................. 2014-002176

(51) Int. Cl.
*G01F 1/66* (2006.01)
(52) U.S. Cl.
CPC .................................... *G01F 1/662* (2013.01)
(58) Field of Classification Search
None
See application file for complete search history.

(56) References Cited

U.S. PATENT DOCUMENTS

2012/0186350 A1* 7/2012 Murakami .............. G01F 1/662
                                                                 73/633
2012/0266690 A1    10/2012 Ozaki et al.
(Continued)

FOREIGN PATENT DOCUMENTS

EP    2 594 907 A1    5/2013
JP    62-128382 U     8/1987
(Continued)

OTHER PUBLICATIONS

International Search Report of PCT application No. PCT/JP2015/000028 dated Mar. 3, 2015.
(Continued)

*Primary Examiner* — Harshad R Patel
(74) *Attorney, Agent, or Firm* — Brinks Gilson & Lione

(57) ABSTRACT

A flow-rate measurement device which measures a flow rate of a fluid flowing through a fluid flow channel unit includes a tubular measurement flow channel unit that is stored in the fluid flow channel unit and has an inside in communication with the fluid flow channel unit. The flow-rate measurement device also includes a pair of sealing materials that blocks a flow of a fluid and is provided to encircle outer peripheries of the measurement flow channel unit at a first end and a second end; and a measurement unit including a substrate, on which a measurement circuit is mounted, and a pair of ultrasonic transducers. Further, the pair of ultrasonic transducers is electrically and fixedly connected to the substrate in the measurement unit, and the measurement unit is disposed between the pair of sealing materials on the measurement flow channel unit.

8 Claims, 6 Drawing Sheets

(56) References Cited

U.S. PATENT DOCUMENTS

| | | | | |
|---|---|---|---|---|
| 2013/0263677 A1* | 10/2013 | Miyata | ............... | G01F 1/66 73/861.29 |
| 2015/0013472 A1* | 1/2015 | Gill | ............... | G01F 1/662 73/861.31 |
| 2015/0143919 A1* | 5/2015 | Nakano | ............... | G01F 1/66 73/861.28 |
| 2016/0161525 A1* | 6/2016 | Evans | ............... | G01P 5/245 73/170.13 |

FOREIGN PATENT DOCUMENTS

| | | |
|---|---|---|
| JP | 2005-283565 | 10/2005 |
| JP | 2006-053067 A | 2/2006 |
| JP | 2011-112499 | 6/2011 |
| JP | 2011-128146 | 6/2011 |
| WO | 2011/040037 | 4/2011 |

OTHER PUBLICATIONS

Extended Search Report in corresponding European Application No. 15735455.6, dated Dec. 8, 2016, 12 pages.

\* cited by examiner

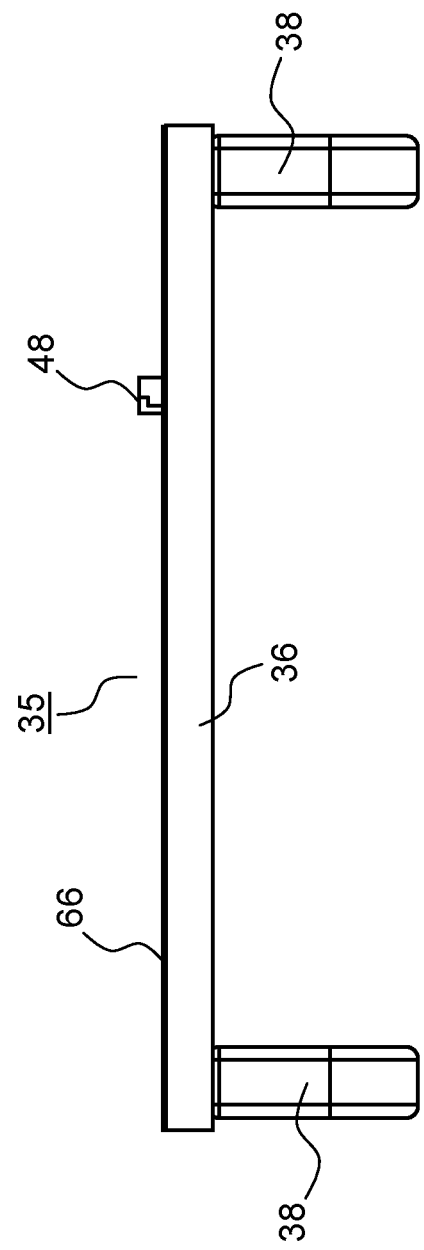

FLOW-RATE MEASUREMENT DEVICE

TECHNICAL FIELD

The present invention relates to a flow-rate measurement device, and more particularly, to a flow-rate measurement device including a measurement flow channel unit stored in a fluid flow channel unit to measure the flow rate of a fluid flowing through the measurement flow channel unit.

BACKGROUND ART

A flow-rate measurement device including a measurement flow channel unit stored in a fluid flow channel unit has been known as a conventional flow-rate measurement device. For example, in a flow-rate measurement device disclosed in PTL 1, a measurement flow channel unit around which a rubber band is wound is stored in a gas flow channel unit, and a flow rate sensor is disposed at the side face of the measurement flow channel unit. With this rubber band, the gap between the inner surface of the gas flow channel unit and the outer surface of the measurement flow channel unit is closed. Thus, gas in the gas flow channel unit is guided to the measurement flow channel unit, and the flow rate of the gas flowing through the measurement flow channel unit is measured with the flow rate sensor.

However, in the conventional flow-rate measurement device disclosed in PTL 1, the flow rate sensor is disposed away from an electric circuit that measures the flow rate, and thus, a long lead line for connecting the flow rate sensor and the electric circuit is needed. Consequently, external noise is likely to enter the lead line, entailing deterioration in the measurement precision due to noise.

Citation List

Patent Literature
PTL 1: Unexamined Japanese Patent Publication No. 2005-283565

SUMMARY OF THE INVENTION

The present invention has been made to solve the above problem, and an object thereof is to provide a flow-rate measurement device that implements enhancement in measurement precision.

A flow-rate measurement device according to one aspect of the present invention measures a flow rate of a fluid flowing through a fluid flow channel unit, and includes a tubular measurement flow channel unit that is stored in the fluid flow channel unit and has an inside in communication with the fluid flow channel unit. The flow-rate measurement device also includes a pair of sealing materials that blocks a flow of a fluid and is provided to encircle outer peripheries of the measurement flow channel unit at a first end and a second end; and a measurement unit including a substrate, on which a measurement circuit is mounted, and a pair of ultrasonic transducers. Further, the pair of ultrasonic transducers is electrically and fixedly connected to the substrate in the measurement unit, and the measurement unit is disposed between the pair of sealing materials on the measurement flow channel unit.

The present invention has the configuration described above, and provides an effect of being capable of providing a flow-rate measurement device that implements enhancement in measurement precision.

The above object, other objects, features, and advantages of the present invention will be made apparent by the following detailed description of preferred exemplary embodiments with reference to the accompanying drawings.

BRIEF DESCRIPTION OF DRAWINGS

FIG. 6 is a view of a substrate in a flow-rate measurement device according to a third exemplary embodiment of the present invention.

DESCRIPTION OF EMBODIMENTS

Figure 1:
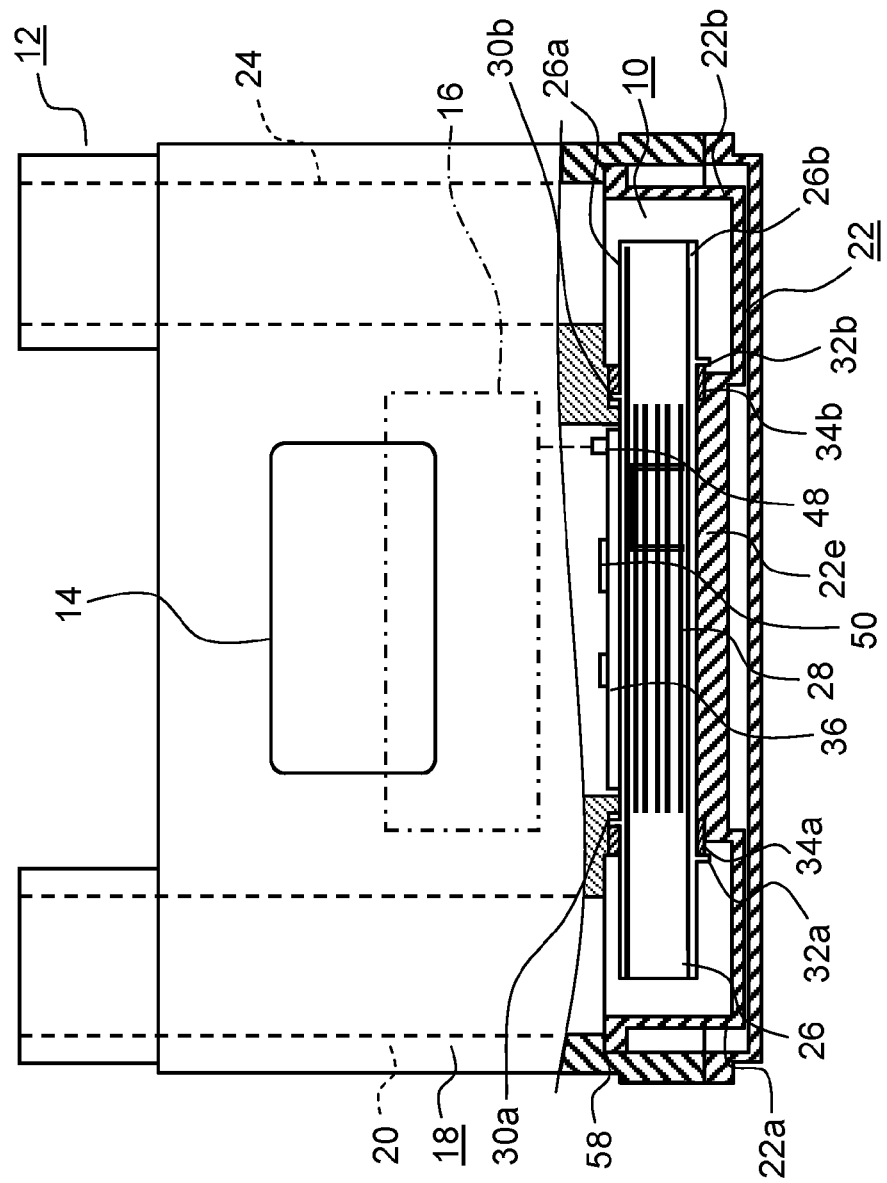
FIG. 1 is a schematic view of a gas meter provided with a flow-rate measurement device according to a first exemplary embodiment of the present invention.

A flow-rate measurement device according to a first aspect of the present invention measures a flow rate of a fluid flowing through a fluid flow channel unit, and includes a tubular measurement flow channel unit that is stored in the fluid flow channel unit and has an inside in communication with the fluid flow channel unit. The flow-rate measurement device also includes a pair of sealing materials that blocks a flow of a fluid and is provided to encircle outer peripheries of the measurement flow channel unit at a first end and a second end of the measurement flow channel unit; and a measurement unit including a substrate, on which a measurement circuit is mounted, and a pair of ultrasonic transducers. Further, the pair of ultrasonic transducers is electrically and fixedly connected to the substrate in the measurement unit, and the measurement unit is disposed between the pair of sealing materials on the measurement flow channel unit.

A second aspect provides the flow-rate measurement device according to the first aspect, wherein the measurement circuit includes a propagation time measurement unit that measures a time during which an ultrasonic wave propagates between the pair of ultrasonic transducers; and a calculation unit that calculates the flow rate of a fluid based on the time measured by the propagation time measurement unit.

A third aspect provides the flow-rate measurement device according to the first aspect, wherein a positioning section is provided on at least one of the measurement flow channel unit and the substrate.

A fourth aspect provides the flow-rate measurement device according to the first aspect further including a lead pin connected to the pair of ultrasonic transducers, wherein the lead pin being inserted into a hole of the substrate.

A fifth aspect provides the flow-rate measurement device according to the first aspect further including an insulating damping section covering the substrate.

A sixth aspect provides the flow-rate measurement device according to the first aspect, wherein the pair of ultrasonic transducers is disposed opposite each other across the measurement flow channel unit.

A seventh aspect provides the flow-rate measurement device according to the first aspect further including a reflection section fixed to the substrate, wherein the pair of ultrasonic transducers being disposed with the measurement flow channel unit being held between the reflection section and the ultrasonic transducers.

An eighth aspect provides the flow-rate measurement device according to the first aspect, wherein the fluid flow channel unit is configured such that an inflow pipe unit, an intermediate flow channel unit, and an outflow pipe unit are sequentially connected, and the measurement flow channel unit is stored in the intermediate flow channel unit in the fluid flow channel unit. The flow-rate measurement device according to the eighth aspect may also be configured such that one of the sealing materials is provided to fill between a downstream end of the inflow pipe unit and the outer periphery of the measurement flow channel unit at the first end, while the other sealing material is provided to fill between an upstream end of the outflow pipe unit and the outer periphery of the measurement flow channel unit at the second end.

The exemplary embodiments of the present invention will be specifically described below with reference to the drawings.

In the drawings, the same or corresponding elements are denoted by the same reference marks, and repeating the same descriptions is avoided below.

FIRST EXEMPLARY EMBODIMENT (Configuration of Gas Meter)

FIG. 1 is a view schematically illustrating gas meter 12 provided with flow-rate measurement device 10 according to the first exemplary embodiment. It is to be noted that, although gas will be described below as one example of a fluid, other gas such as air or liquid such as water can be used as a fluid. A flow-rate measurement device that measures the flow rate of a fluid other than gas is similar to flow-rate measurement device 10 that measures the flow rate of gas, so that the description thereof will be omitted.

As illustrated in FIG. 1, gas meter 12 has a shape of substantially rectangular solid (including a shape of rectangular solid), and has display unit 14 on its front surface, for example. Gas meter 12 has an internal space in which control circuit 16 and fluid flow channel unit 18 are provided. Control circuit 16 includes, for example, an integrated circuit (not illustrated) for transmitting information of the measured gas flow rate with wireless communication, an integrated circuit (not illustrated) for controlling each component, and a memory (not illustrated) for storing information. Fluid flow channel unit 18 is a pipe line that forms a fluid flow channel, and includes inflow pipe unit 20, intermediate flow channel unit 22, and outflow pipe unit 24. Notably, gas flows from inflow pipe unit 20 to outflow pipe unit 24 through intermediate flow channel unit 22. Therefore, the upstream side and the downstream side are relatively defined along the flow of gas.

Inflow pipe unit 20 includes a columnar internal space (inflow channel), and outflow pipe unit 24 includes a columnar internal space (outflow channel). The inflow channel of inflow pipe unit 20 and the outflow channel of outflow pipe unit 24 extend parallel to each other in the internal space of the body of gas meter 12. The upstream end of inflow pipe unit 20 and the downstream end of outflow pipe unit 24 are cylindrical, and project upward from the body. The upstream end of inflow pipe unit 20 is connected to a gas pipe (not illustrated) connected to a gas supply source, and the downstream end of inflow pipe unit 20 is connected to an inflow port of intermediate flow channel unit 22. The downstream end of outflow pipe unit 24 is connected to a gas pipe (not illustrated) connected to a gas consumer, and the upstream end of outflow pipe unit 24 is connected to an outflow port of intermediate flow channel unit 22. The gap between the downstream end of inflow pipe unit 20 and intermediate pipe unit 22 and the gap between the upstream end of outflow pipe unit 24 and intermediate flow channel unit 22 are closed by filler 58.

Intermediate flow channel unit 22 is formed from metal such as aluminum, for example. Intermediate flow channel unit 22 has a shape of container which is open at the top, and includes an internal space (intermediate flow channel). A region (inflow port) of the opening surrounded by upstream wall 22a of intermediate flow channel unit 22 faces an opening of inflow pipe unit 20 at the downstream end. Further, a region (outflow port) of the opening surrounded by downstream wall 22b of intermediate flow channel unit 22 faces an opening of outflow pipe unit 24 at the upstream end. With this, the intermediate flow channel in intermediate flow channel unit 22, the inflow channel in inflow pipe unit 20, and the outflow channel in outflow pipe unit 24 are in communication with one another to form a fluid flow channel. Measurement flow channel unit 26 of flow-rate measurement device 10 is stored in the intermediate flow channel (fluid flow channel) in intermediate flow channel unit 22.

Measurement flow channel unit 26 is a hollow member open at both ends, and its internal space is used as a measurement flow channel. In the present exemplary embodiment, measurement flow channel unit 26 is formed from a cylindrical member having a rectangular cross-section. The length of measurement flow channel unit 26 is shorter than the length of intermediate flow channel unit 22. Therefore, a gap is formed between the upstream end of measurement flow channel unit 26 and upstream wall 22a of intermediate flow channel unit 22 and between the downstream end of measurement flow channel unit 26 and downstream wall 22b of intermediate flow channel unit 22, respectively. The measurement flow channel in measurement flow channel unit 26 is in communication with the fluid flow channel in intermediate flow channel unit 22 through the gap.

A plurality of (five in the present exemplary embodiment) flow regulating plates 28 is provided in measurement flow channel unit 26. Flow regulating plates 28 extend along an axis of measurement flow channel unit 26 so as to be parallel to top plate 26a and bottom plate 26b of measurement flow channel unit 26. The measurement flow channel of measurement flow channel unit 26 is partitioned in a parallel manner with flow regulating plates 28.

Two first ribs 30a and 30b are provided on the outer surface of top plate 26a of measurement flow channel unit 26, first ribs 30a and 30b being provided with a space therebetween in a gas flowing direction (hereinafter referred to as "horizontal direction") in the measurement flow channel along the axis of measurement flow channel unit 26. Further, two second ribs 32a and 32b are provided on the outer surface of bottom plate 26b of measurement flow channel unit 26 so as to have a space therebetween in the horizontal direction. A gap is formed between first rib (upstream first rib) 30a which is located at the upstream side out of two first ribs 30a and 30b and second rib (upstream second rib) 32a which is located at the upstream side out of two second ribs 32a and 32b in the horizontal direction. A gap is also formed between first rib (downstream first rib) 30b located at the downstream side and second rib (downstream second rib) 32b located at the downstream side in the horizontal direction. Annular sealing materials 34a and 34b are provided in these gaps.

A pair of sealing materials 34a and 34b is mounted to measurement flow channel unit 26 so as to have a space therebetween in the horizontal direction. Sealing material at the upstream end (upstream sealing material) 34a of measurement flow channel unit 26 is provided in the gap between upstream first rib 30a and upstream second rib 32a. Sealing material at the downstream end (downstream sealing material) 34b of measurement flow channel unit 26 is provided in the gap between downstream first rib 30b and downstream second rib 32b. Sealing materials 34a and 34b are wound around measurement flow channel unit 26 in a direction perpendicular to the axis of measurement flow channel unit 26, and encircle the outer periphery of measurement flow channel unit 26. The thickness of sealing materials 34a and 34b is set to be equal to or larger than the size of the gap between the inner surface of fluid flow channel unit 18 and the outer surface of measurement flow channel unit 26. Examples of the gap include the gap between top plate 26a of measurement flow channel unit 26 and the downstream end of inflow pipe unit 20 facing top plate 26a, the gap between top plate 26a of measurement flow channel unit 26 and the upstream end of outflow pipe unit 24 facing top plate 26a, and the gap between bottom part 22e of intermediate flow channel unit 22 and bottom plate 26b of measurement flow channel unit 26. With sealing materials 34a and 34b, the gap between the inner surface of fluid flow channel unit 18 and the outer surface of measurement flow channel unit 26 is closed, so that the flow of gas is blocked. Accordingly, the fluid flow channel in fluid flow channel unit 18 and the measurement flow channel in the measurement flow channel unit 26 are connected in an airtight manner, so that gas flowing through the fluid flow channel flows through the measurement flow channel. Specifically, gas flowing through inflow pipe unit 20 all flows toward outflow pipe unit 24 through measurement flow channel unit 26 without flowing through the outside of measurement flow channel unit 26.

Substrate 36 is provided on the outer surface of top plate 26a of measurement flow channel unit 26 between the pair of sealing materials 34a and 34b. Top plate 26a is exposed from the opening of intermediate flow channel unit 22 between the pair of sealing materials 34a and 34b, and substrate 36 is provided on this portion. Within the exposed range, the gap between fluid flow channel unit 18 and measurement flow channel unit 26 is closed by sealing materials 34a and 34b. Therefore, gas in the fluid flow channel in fluid flow channel unit 18 does not flow over substrate 36 beyond sealing materials 34a and 34b on the outer surface of top plate 26a.

(Configuration of Flow-Rate Measurement Device)

Figure 2:
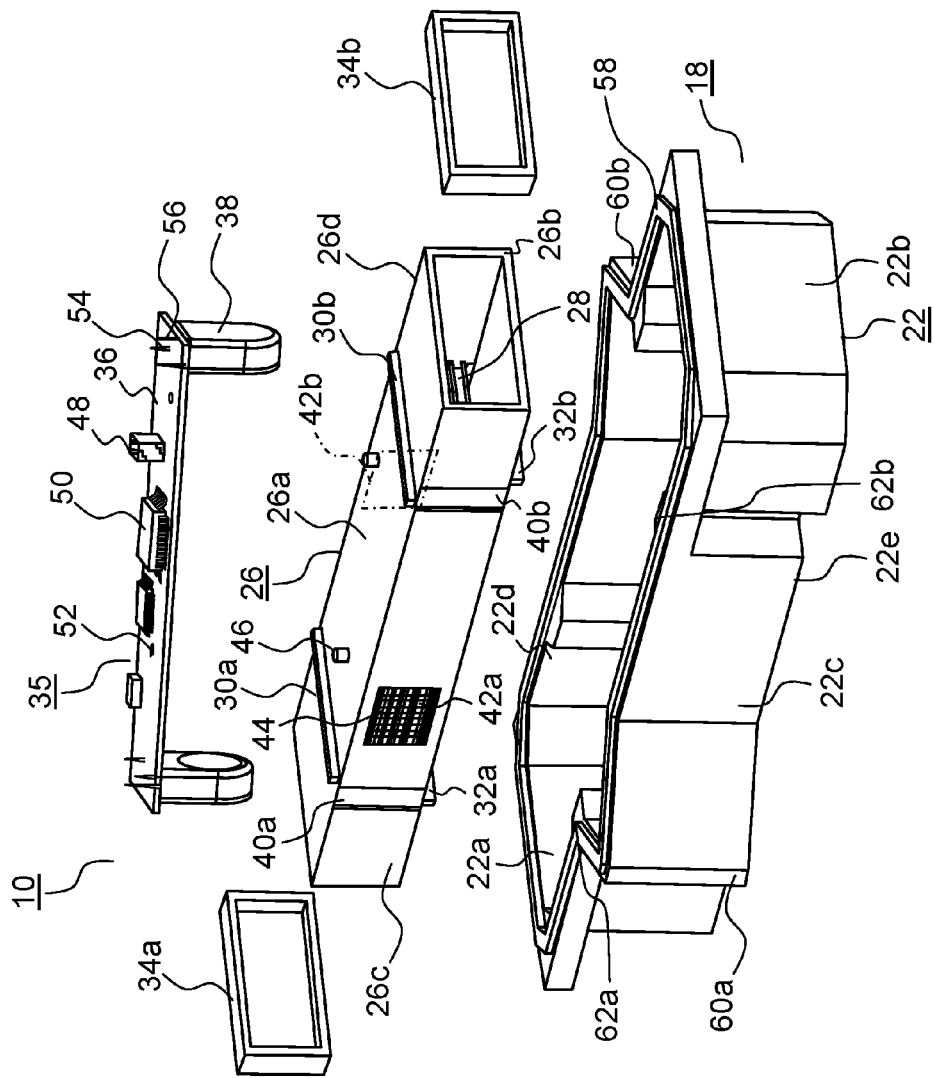
FIG. 2 is an exploded perspective view illustrating the flow-rate measurement device and an intermediate flow channel unit illustrated in FIG. 1.

FIG. 2 is an exploded perspective view illustrating flow-rate measurement device 10 and intermediate flow channel unit 22. The configuration of flow-rate measurement device 10 will be described in more detail with reference to FIG. 2. As illustrated in FIG. 2, flow-rate measurement device 10 includes measurement flow channel unit 26, measurement unit 35, and sealing materials 34a and 34b. Measurement unit 35 includes substrate 36 and a pair of ultrasonic transducers 38.

Measurement flow channel unit 26 has a tubular outer wall which includes top plate 26a, bottom plate 26b facing top plate 26a, and a pair of side plates 26c and 26d perpendicular to these plates. The pair of first ribs 30a and 30b provided on top plate 26a and the pair of second ribs 32a and 32b provided on bottom plate 26b extend in the direction perpendicular to the axis of measurement flow channel unit 26. Groove (upstream groove) 40a extending in the vertical direction is formed on side plates 26c and 26d of measurement flow channel unit 26 in the gap between upstream first rib 30a and upstream second rib 32a. Groove (downstream groove) 40b extending in the vertical direction is formed on side plates 26c and 26d of measurement flow channel unit 26 in the gap between downstream first rib 30b and downstream second rib 32b. The width of these grooves 40a and 40b is set equal to the width of sealing materials 34a and 34b.

Sealing materials 34a and 34b are annular members having elasticity, for example, and an O-ring is used. Notably, sealing materials 34a and 34b are not limited to an O-ring, and other member may be used, so long as it fills the gap between the outer wall of fluid flow channel unit 18 and the outer wall of measurement flow channel unit 26. For example, a shaped sealing material other than an O-ring and a paste-like unshaped sealing material may be used for sealing materials 34a and 34b.

Openings 42a and 42b are formed on side plates 26c and 26d of measurement flow channel unit 26. Opening (upstream opening) 42a is formed at the downstream side from upstream groove 40a, and located closer to upstream groove 40a than to downstream groove 40b. Other opening (downstream opening) 42b indicated by a one-dot-chain line is formed at the upstream side from downstream groove 40b, and located closer to downstream groove 40b than to upstream groove 40a. Openings 42a and 42b penetrate side plates 26c and 26d, and are covered by ultrasonic transmission film 44. Ultrasonic transmission film 44 transmits an ultrasonic wave, while inhibits passage of gas, and a mesh is used, for example. Note that openings 42a and 42b are not necessarily covered by ultrasonic transmission film 44.

Projection 46 is provided on the outer surface of top plate 26a of measurement flow channel unit 26 as a positioning section for substrate 36. In the present exemplary embodiment, two columnar projections 46 are formed between the pair of first ribs 30a and 30b so as to project from top plate 26a. One of projections 46 is formed near upstream opening 42a, and the other of projections 46 is formed near downstream opening 42b.

Substrate 36 is a thin plate member, and has an elongated rectangular shape. Components such as electronic components or circuit elements are mounted on the surface of substrate 36. Examples of the components include terminal 48 connected to control circuit 16 (FIG. 1) of gas meter 12 (FIG. 1) and integrated circuit (measurement circuit) 50 having a measurement function of ultrasonic transducer 38. Measurement circuit 50 includes a propagation time measurement unit and a calculation unit. The propagation time measurement unit measures a time during which an ultrasonic wave propagates between the pair of ultrasonic transducers 38. The calculation unit calculates the flow rate of gas based on the time measured by the propagation time measurement unit. The propagation time measurement unit and the calculation unit are implemented by a program stored in measurement circuit 50, for example. Notably, the measurement circuit may be configured by a single circuit having functions of the propagation time measurement unit and the calculation unit, or two circuits independently having the function of the propagation time measurement unit and the function of the calculation unit.

For example, two holes (positioning holes) 52 are formed on substrate 36. These positioning holes 52 are used as a positioning section for positioning substrate 36 to measurement flow channel unit 26. The inner diameter of positioning hole 52 is larger than the outer size of projection 46 on measurement flow channel unit 26, so that projection 46 can be inserted into positioning hole 52. Substrate 36 is placed on a predetermined position of top plate 26a of measurement flow channel unit 26 by fitting projections 46 into positioning holes 52.

Substrate 36 is also provided with holes (insertion holes) 54. In the present exemplary embodiment, three insertion holes 54 are formed on each end of substrate 36. Lead pin 56 of ultrasonic transducer 38 is inserted into each insertion hole 54, then ultrasonic transducer 38 is mounted on the back surface of substrate 36. Ultrasonic transducers 38 are electrically and fixedly connected to substrate 36 through soldering between lead pins 56 and wiring lines on substrate 36. That is, lead pins 56 of ultrasonic transducers 38 and wiring lines on substrate 36 are bonded with soldering. This establishes the state in which electric current flows between lead pins 56 and wiring lines, so that ultrasonic transducers 38 are electrically connected to substrate 36. Further, since ultrasonic transducers 38 are directly fixed to substrate 36, ultrasonic transducers 38 are fixedly connected to substrate 36, so that ultrasonic transducers 38 and substrate 36 are integrated to have a certain shape.

Each of ultrasonic transducers 38 includes a piezoelectric body (not illustrated), an acoustic matching body (not illustrated), and terminals (not illustrated). The piezoelectric body is an element that extends or contracts in the thickness direction with application of voltage and converts electric vibration into mechanical vibration due to the extension/contraction. The acoustic matching body has a radiation surface that radiates the mechanical vibration generated by the piezoelectric body to gas as an ultrasonic wave. The acoustic matching body is an element that performs acoustic impedance matching between the piezoelectric body and gas in order to radiate an ultrasonic wave from the radiation surface. Lead pins 56 are connected to the terminals connected to the piezoelectric body. Ultrasonic transducers 38 are electrically connected to substrate 36 through soldering between lead pins 56 and wiring lines on substrate 36. Notably, ultrasonic transducers 38 and substrate 36 may be electrically connected with lead lines, instead of lead pins 56.

Intermediate flow channel unit 22 has an outer wall having a shape of substantially rectangular solid (including a shape of rectangular solid) open at the top. The outer wall has upstream wall 22a and downstream wall 22b, which are located opposite each other in the gas flowing direction, a pair of side walls 22c and 22d which is located opposite each other in the direction orthogonal to the gas flowing direction, and bottom part 22e. Filler 58 is provided on ends (ends close to the opening) of upstream wall 22a, downstream wall 22b, and side walls 22c and 22d, and filler 58 continuously surround the opening of intermediate flow channel unit 22.

Extension parts 60a and 60b are formed on side walls 22c and 22d by projecting a part of side walls 22c and 22d to the outside. Extension parts 60a and 60b form internal spaces (extension spaces) with a shape of triangular prism. With the extension spaces, a part of the fluid flow channel, which has a substantially rectangular solid shape, in intermediate flow channel unit 22 is extended. Extension part (upstream extension part) 60a on side wall 22c is provided at the downstream side from upstream first rib 30a, and located at a position further upstream than extension part (downstream extension part) 60b on side wall 22d with respect to downstream first rib 30b. Upstream extension part 60a and downstream extension part 60b form a space having a substantially rectangular solid shape (including a rectangular solid shape) through the fluid flow channel in intermediate flow channel unit 22. The cross-section of the space having the substantially rectangular solid shape parallel to bottom part 22e is rectangular, and the size of the rectangular cross-section is set to be slightly larger than the size of substrate 36.

Intermediate flow channel unit 22 is provided with recess (upstream recess) 62a formed at the upstream side of upstream extension part 60a and recess (downstream recess) 62b formed at the downstream side of downstream extension part 60b. Due to these recesses 62a and 62b, the width of the fluid flow channel in intermediate flow channel unit 22 is decreased. The decreased width is set to be substantially equal to the width of measurement flow channel unit 26 to which sealing materials 34a and 34b are fitted. Further, the size between upstream recess 62a and downstream recess 62b is set to be equal to the size between upstream groove 40a and downstream groove 40b. Notably, filler 58 may be provided on recesses 62a and 62b.

(Assembly of Flow-Rate Measurement Device)

Figure 3:
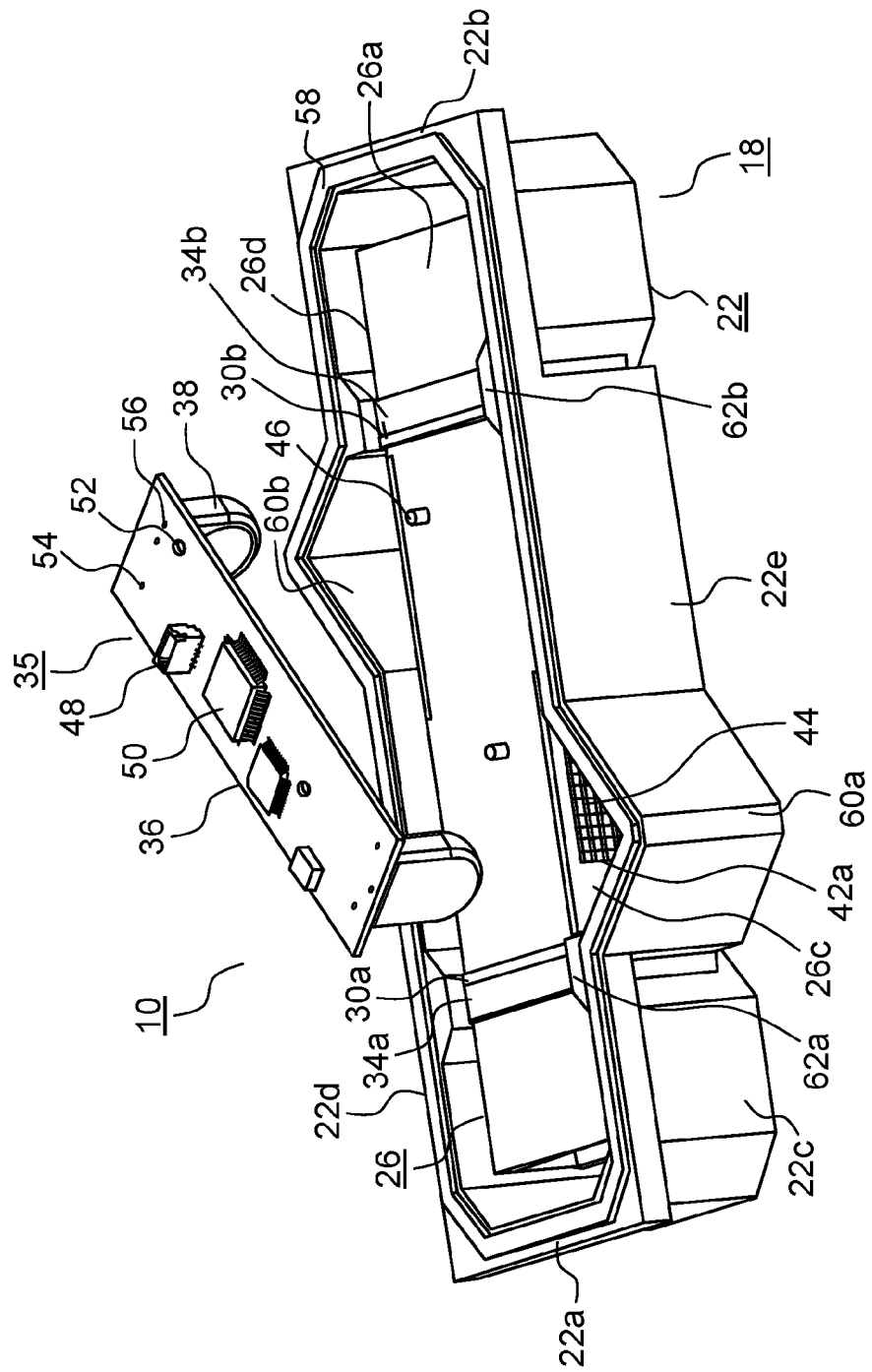
FIG. 3 is a perspective view illustrating the state in which a measurement flow channel unit of the flow-rate measurement device illustrated in FIG. 2 is stored in the intermediate flow channel unit.
Figure 4:
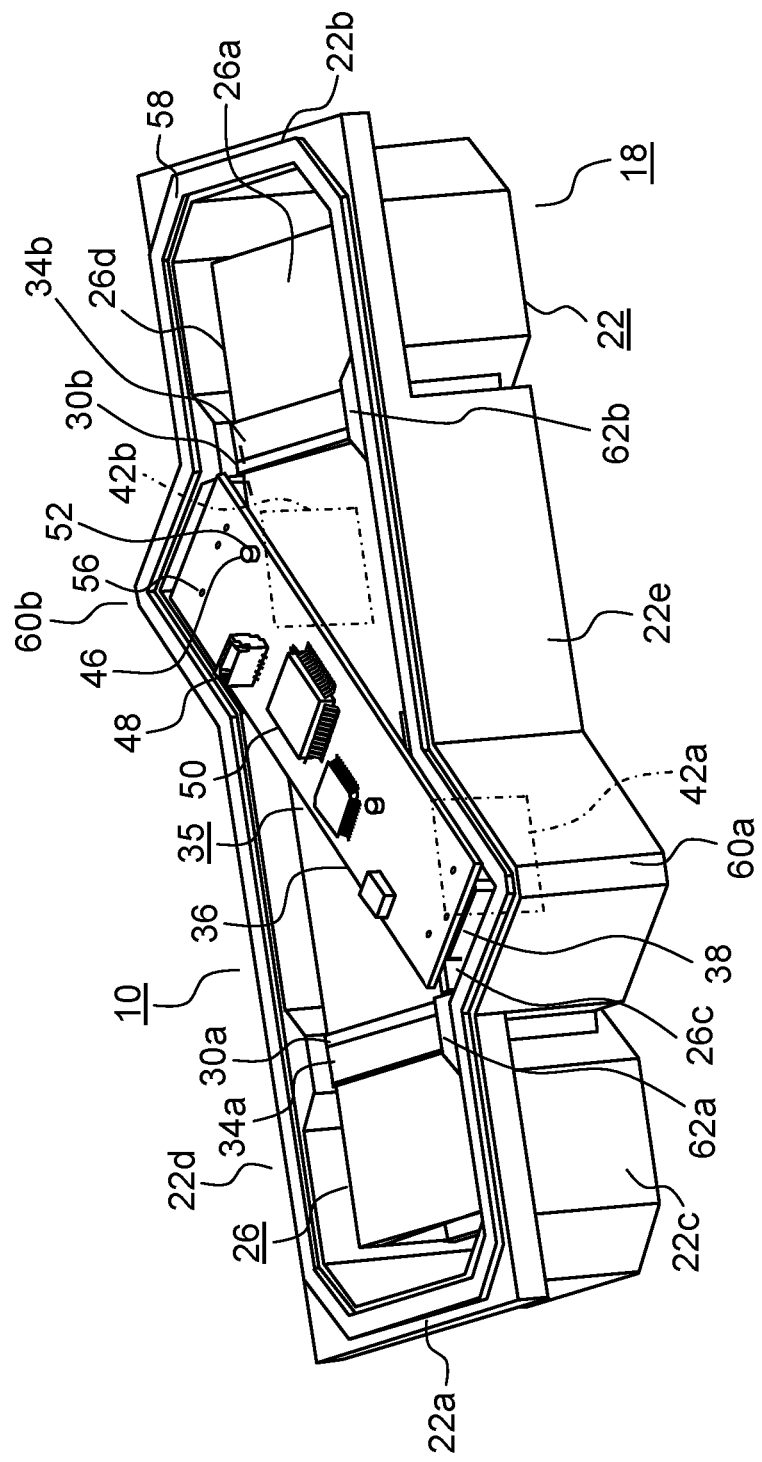
FIG. 4 is a perspective view illustrating the state in which a substrate is mounted to the measurement flow channel unit illustrated in FIG. 3.

FIG. 3 is a perspective view illustrating intermediate flow channel unit 22 storing measurement flow channel unit 26, and substrate 36. FIG. 4 is a perspective view illustrating measurement flow channel unit 26 to which substrate 36 is mounted. The assembly of flow-rate measurement device 10 will be described below with reference to FIGS. 1 to 4.

As illustrated in FIG. 2, sealing materials 34a and 34b are fitted to upstream groove 40a and downstream groove 40b of measurement flow channel unit 26, respectively. Then, measurement flow channel unit 26 is stored in intermediate flow channel unit 22 such that each of sealing materials 34a and 34b corresponds to each of recesses 62a and 62b of intermediate flow channel unit 22. Thus, as illustrated in FIG. 3, sealing materials 34a and 34b are in close contact with the outer surface of measurement flow channel unit 26 and the inner surface of intermediate flow channel unit 22, thereby closing the gap between side plates 26c and 26d of measurement flow channel unit 26 and recesses 62a and 62b of intermediate flow channel unit 22 and the gap between bottom plate 26b (FIG. 2) of measurement flow channel unit 26 and bottom part 22e (FIG. 2) of intermediate flow channel unit 22. With sealing materials 34a and 34b, the portion between measurement flow channel unit 26 and intermediate flow channel unit 22 is partitioned into three spaces in an airtight manner, except for the portion close to top plate 26a of measurement flow channel unit 26. Specifically, one of the spaces is the fluid flow channel (upstream intermediate flow channel) between upstream recess 62a and upstream wall 22a. The second is the fluid flow channel (downstream intermediate flow channel) between downstream recess 62b and downstream wall 22b. The third is the fluid flow channel (center intermediate flow channel) between upstream recess 62a and downstream recess 62b. The center intermediate flow channel is isolated from the upstream intermediate flow channel and the downstream intermediate flow channel by sealing materials 34a and 34b. Further, a space is formed between the upstream end of measurement flow channel unit 26 and upstream wall 22a of intermediate flow channel unit 22 and between the downstream end of measurement flow channel unit 26 and downstream wall 22b of intermediate flow channel unit 22, respectively. Therefore, the upstream intermediate flow channel is in communication with the measurement flow channel in measurement flow channel unit 26 through the opening at the upstream end of measurement flow channel unit 26. The downstream intermediate flow channel is in communication with the measurement flow channel in measurement flow channel unit 26 through the opening at the downstream end of measurement flow channel unit 26.

Next, substrate 36 is mounted on top plate 26a of measurement flow channel unit 26, while projections 46 on measurement flow channel unit 26 are inserted into positioning holes 52 of substrate 36. With this, substrate 36 is provided between the pair of sealing materials 34a and 34b so as to be fixed on measurement flow channel unit 26 in close contact therewith as illustrated in FIG. 4. Further, substrate 36 falls within the range enclosed by extension parts 60a and 60b, and ultrasonic transducers 38 fixed to substrate 36 are inserted into the extension spaces of extension parts 60a and 60b. Each ultrasonic transducer 38 is mounted such that the path of an ultrasonic wave radiated from the radiation surface passes through openings 42a and 42b and tilts relative to the axis of measurement flow channel unit 26 at a predetermined angle. The path of the ultrasonic wave is determined based on a refractive index between air and gas.

Subsequently, as illustrated in FIG. 1, intermediate flow channel unit 22 storing measurement flow channel unit 26 is stored in the internal space of gas meter 12. In this case, intermediate flow channel unit 22 is disposed such that sealing materials 34a and 34b of measurement flow channel unit 26 and filler 58 of intermediate flow channel unit 22 are in close contact with the downstream end of inflow pipe unit 20 and the upstream end of outflow pipe unit 24 respectively. With this, the inflow channel of the inflow pipe unit 20 and the upstream intermediate flow channel of intermediate flow channel unit 22 are connected to each other, and the outflow channel of outflow pipe unit 24 and the downstream intermediate flow channel of intermediate flow channel unit 22 are connected to each other. Further, since the upstream intermediate flow channel and the downstream intermediate flow channel are in communication with the measurement flow channel, the inflow channel, the upstream intermediate flow channel, the measurement flow channel, the downstream intermediate flow channel, and the outflow channel are connected in this order to form a single U-shaped flow channel.

In this case, substrate 36 is disposed on the outer surface of measurement flow channel unit 26 between inflow pipe unit 20 and outflow pipe unit 24. Therefore, substrate 36 is exposed in the internal space of gas meter 12. Therefore, terminal 48 on substrate 36 is connected to control circuit 16 with lead lines, and thus, flow-rate measurement device 10 is installed in gas meter 12.

(Operation of Flow-Rate Measurement Device)

In order to measure the flow rate of gas flowing through the fluid flow channel, the gas pipe is connected to inflow pipe unit 20 and outflow pipe unit 24. With this, gas is supplied from the gas pipe, and flows through the inflow channel of inflow pipe unit 20 into the upstream intermediate flow channel of intermediate flow channel unit 22. Then, the gas flows into the measurement flow channel from the upstream intermediate flow channel through the opening at the upstream end of measurement flow channel unit 26, flows through the measurement flow channel, and flows into the downstream intermediate flow channel through the opening at the downstream end of measurement flow channel unit 26. Further, the gas flows into the outflow channel of outflow pipe unit 24 from the downstream intermediate flow channel, and flows toward the gas pipe.

When the measurement circuit 50 transmits an electric signal to upstream ultrasonic transducer 38 with the state in which gas flows through the measurement flow channel, for example, this ultrasonic transducer 38 converts the electric signal into an ultrasonic wave, and radiates the ultrasonic wave from the radiation surface. Thus, the ultrasonic wave enters the measurement flow channel through upstream opening 42a, diagonally crosses the measurement flow channel, exits from downstream opening 42b, and reaches downstream ultrasonic transducer 38. Downstream ultrasonic transducer 38 receives this ultrasonic wave, converts the received ultrasonic wave into electric vibration, and outputs the electric vibration to measurement circuit 50.

Measurement circuit 50 obtains the propagation time of the ultrasonic wave based on the difference between the time at which upstream ultrasonic transducer 38 outputs the electric signal and the time at which downstream ultrasonic transducer 38 inputs the electric signal. Similarly, downstream ultrasonic transducer 38 radiates an ultrasonic wave, and upstream ultrasonic transducer 38 receives this ultrasonic wave. The propagation time measurement unit obtains the propagation time of the ultrasonic wave. Finally, the calculation unit calculates the flow rate of gas based on the propagation time obtained by the propagation time measurement unit, and measurement circuit 50 outputs the flow rate of gas to control circuit 16. Control circuit 16 stores information concerning the acquired flow rate of gas into the memory, and displays the acquired flow rate on display unit 14, or transmits the acquired flow rate to the outside using a wireless circuit or an antenna.

(Operation and Effects)

According to the above configuration, the gap between measurement flow channel unit 26 and fluid flow channel unit 18 is closed by sealing materials 34a and 34b. With this, the measurement flow channel in measurement flow channel unit 26 and the fluid flow channel in fluid flow channel unit 18 are connected, and thus, gas is prevented from flowing between the pair of sealing materials 34a and 34b. Accordingly, when substrate 36 is disposed between the pair of sealing materials 34a and 34b, gas hardly flows over substrate 36 or measurement circuit 50 mounted thereon, so that the occurrence of troubles due to the flow of gas can be prevented.

Further, lead pins 56 of ultrasonic transducers 38 are bonded to insertion holes 54 of substrate 36 with soldering. With this, ultrasonic transducers 38 can be fixedly and electrically connected to substrate 36. Consequently, flow-rate measurement device 10 can be downsized, and workability can be enhanced. In addition, the distance between substrate 36 and ultrasonic transducers 38 can be shortened to reduce the occurrence of noise therebetween, so that the measurement precision of flow-rate measurement device 10 can be enhanced.

Further, substrate 36 is disposed on measurement flow channel unit 26, and ultrasonic transducers 38 are directly fixed to substrate 36. This eliminates the need to separately prepare a member for holding substrate 36 and ultrasonic transducers 38 to measurement flow channel unit 26, so that cost can be reduced, and downsizing of gas meter 12 is enabled. In addition, substrate 36 is exposed to the internal space of gas meter 12 from the opening of intermediate flow channel unit 22 between inflow pipe unit 20 and outflow pipe unit 24. Therefore, substrate 36 and control circuit 16 in gas meter 12 can easily be connected.

Further, projections 46 of measurement flow channel unit 26 and positioning holes 52 of substrate 36 are provided. Thus, substrate 36 can easily be mounted at a predetermined position on top plate 26a of measurement flow channel unit 26. In addition, ultrasonic transducers 38 are fixed to substrate 36. Specifically, the formation of space between the pair of ultrasonic transducers 38 and orientation setting thereof have already been completed with the pair of transducers 38 being mounted to substrate 36, before they are disposed across the measurement flow channel. Therefore, it is unnecessary to adjust the positions of ultrasonic transducers 38 fixed to substrate 36, which provides excellent workability upon disposing ultrasonic transducers 38 relative to the measurement flow channel.

Further, substrate 36 and ultrasonic transducers 38 are integrally formed into a unit. Therefore, when quality inspection is performed to the measurement unit or flow-rate measurement device 10 in which the measurement unit is mounted to measurement flow channel unit 26, the measurement unit or flow-rate measurement device 10 can independently be inspected. Accordingly, the measurement unit or flow-rate measurement device 10 can be inspected under an environment suitable for quality inspection, whereby enhancement in precision and simplification of the inspection are enabled. In addition, defective products can be found early through the inspection of the measurement unit or flow-rate measurement device 10 before they are installed in gas meter.

Further, vibration applied to measurement flow channel unit 26 and ultrasonic transducers 38 from the outside is cut off by metallic intermediate flow channel unit 22. This suppresses deterioration in measurement precision of flow-rate measurement device 10 due to the noise caused by external vibration.

SECOND EXEMPLARY EMBODIMENT

Figure 5:
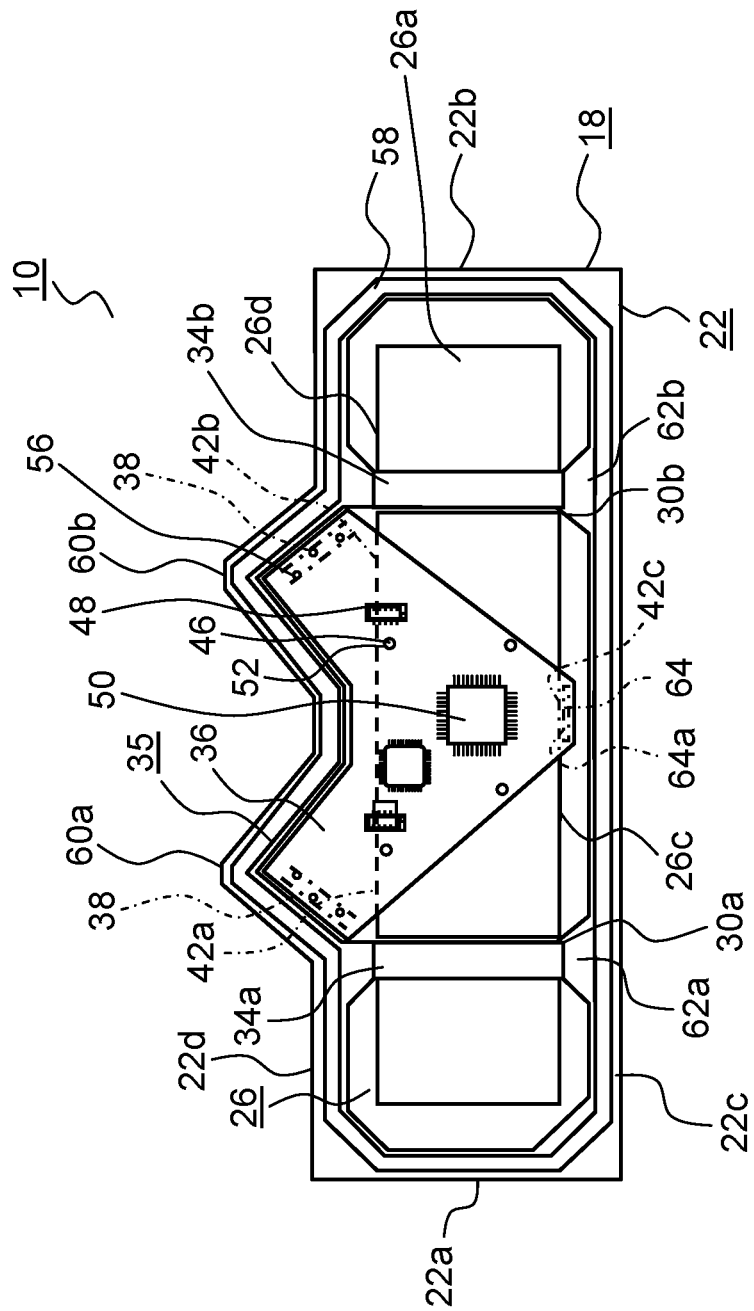
FIG. 5 is a view illustrating a flow-rate measurement device according to a second exemplary embodiment of the present invention.

FIG. 5 is a view illustrating flow-rate measurement device 10 according to the second exemplary embodiment. As illustrated in FIG. 5, in flow-rate measurement device 10 according to the second exemplary embodiment, a pair of ultrasonic transducers 38 is disposed such that measurement flow channel unit 26 is held between the pair of ultrasonic transducers 38 and reflection surface 64a.

Two extension parts 60a and 60b are provided on side wall 22d of intermediate flow channel unit 22 so as to be adjacent to each other with a space. Extension parts 60a and 60b are disposed between upstream recess 62a and downstream recess 62b.

Two openings 42a and 42b are formed on side plate 26d of measurement flow channel unit 26 so as to be adjacent to each other with a space. Opening 42c is formed on other side plate 26c, and this opening 42c is formed between two openings 42a and 42b. Projection 46 is provided on top plate 26a of measurement flow channel unit 26 as a positioning section for substrate 36. In the present exemplary embodiment, four columnar projections 46 are formed between the pair of first ribs 30a and 30b so as to project from top plate 26a.

Substrate 36 is a thin plate member, and has a V shape. Substrate 36 has an upstream end, a downstream end, and an intermediate end sandwiched between the upstream end and the downstream end. The width between the intermediate end and both the upstream end and the downstream end is set to be larger than the width of measurement flow channel unit 26. Ultrasonic transducer 38 is electrically and fixedly connected to each of the upstream end and the downstream end with lead pins 56 or the like. Ultrasonic transducers 38 are provided on the back surface of substrate 36. Reflection section 64 including reflection surface 64a is fixed to the intermediate end. Reflection section 64 is provided on the back surface of substrate 36. Ultrasonic transducers 38 and reflection section 64 are provided such that an ultrasonic wave radiated from one of ultrasonic transducers 38 is reflected on reflection surface 64a and received by other ultrasonic transducer 38. In addition, four positioning holes 52 are formed on substrate 36, for example. These positioning holes 52 are used as a positioning section for substrate 36.

When flow-rate measurement device 10 is assembled, sealing materials 34a and 34b are fitted to measurement flow channel unit 26 along first ribs 30a and 30b. Measurement flow channel unit 26 is stored in intermediate flow channel unit 22 such that each of sealing materials 34a and 34b corresponds to each of recesses 62a and 62b of intermediate flow channel unit 22. Next, substrate 36 is mounted on top plate 26a of measurement flow channel unit 26, while projections 46 on measurement flow channel unit 26 are inserted into positioning holes 52 of substrate 36. In this case, substrate 36 is disposed between the pair of sealing materials 34a and 34b, and ultrasonic transducers 38 fixed to substrate 36 are inserted into the extension spaces of extension parts 60a and 60b of measurement flow channel unit 26. Further, reflection section 64 fixed to substrate 36 is inserted between side plate 26c of measurement flow channel unit 26 and side wall 22c of intermediate flow channel unit 22. Thus, measurement flow channel unit 26 is disposed as being held between the pair of ultrasonic transducers 38 and reflection section 64. Ultrasonic transducers 38 are disposed such that the paths of the ultrasonic wave tilt at a predetermined angle relative to the axis of measurement flow channel unit 26. Further, reflection section 64 is disposed such that reflection surface 64a is located at an intersection of these paths. Finally, intermediate flow channel unit 22 storing measurement flow channel unit 26 is stored in the internal space of gas meter 12.

When the measurement circuit 50 transmits an electric signal to upstream ultrasonic transducer 38 in measuring the flow rate of gas flowing through the fluid flow channel with flow-rate measurement device 10 described above, for example, ultrasonic transducer 38 converts the electric signal into an ultrasonic wave, and radiates the ultrasonic wave from the radiation surface. The ultrasonic wave enters the measurement flow channel through upstream opening 42a, diagonally crosses the measurement flow channel, and reaches reflection surface 64a through opening 42c. Then, the ultrasonic wave is reflected on reflection surface 64a, again enters the measurement flow channel through opening 42c, diagonally crosses the measurement flow channel, exits from downstream opening 42b, and reaches downstream ultrasonic transducer 38. Downstream ultrasonic transducer 38 receives this ultrasonic wave, converts the received ultrasonic wave into electric vibration, and outputs the electric vibration to measurement circuit 50.

Measurement circuit 50 obtains the propagation time of the ultrasonic wave based on the difference between the time at which upstream ultrasonic transducer 38 outputs the electric signal and the time at which downstream ultrasonic transducer 38 inputs the electric signal. Similarly, downstream ultrasonic transducer 38 radiates an ultrasonic wave, and upstream ultrasonic transducer 38 receives this ultrasonic wave. The propagation time measurement unit obtains the propagation time of the ultrasonic wave. Finally, the calculation unit calculates the flow rate of gas based on the time acquired by the propagation time measurement unit.

THIRD EXEMPLARY EMBODIMENT

FIG. 6 is a view illustrating substrate 36 used in flow-rate measurement device 10 according to the third exemplary embodiment. As illustrated in FIG. 6, flow-rate measurement device 10 further includes insulating damping material 66.

Insulating damping material 66 is a thin film, for example, and it covers the outer surface of substrate 36. Notably, insulating damping material 66 may cover a part of the outer surface of substrate 36, or cover the outer surface of substrate 36 together with the outer surface of the piezoelectric body.

Insulating damping material 66 is formed from a thermoplastic resin having a low glass-transition temperature, such as thermoplastic elastomer material or crystalline polyester. Examples of thermoplastic elastomer materials include styrene elastomer, olefin elastomer, and polyester elastomer and the like. A glass-transition temperature of a thermoplastic resin is preferably equal to or lower than −30° C. which is the lowest temperature for the measurement of flow rate, for example, within the range from −50° C. to −90° C. With this, insulating damping material 66 has rubber elasticity, and is capable of showing a damping function upon the measurement of flow rate. Further, a melting point of the thermoplastic resin is preferably equal to or higher than 80° C. which is the highest temperature for the measurement of flow rate, for example, within the range from 100° C. to 200° C. Further, Young's modulus of thermoplastic resin is 0.1 GPa to 1.0 GPa within the lowest temperature to the highest temperature for the measurement of flow rate, for example.

According to the above configuration, the vibration of substrate 36 due to the vibration during the radiation of the ultrasonic wave from one of ultrasonic transducers 38 can be suppressed by insulating damping material 66 covering substrate 36. Therefore, reverberation noise due to the vibration of substrate 36 can be reduced. Further, the above configuration can prevent the vibration from propagating to other ultrasonic transducer 38 through substrate 36, thereby being capable of reducing propagation noise. Consequently, the measurement precision of flow-rate measurement device 10 can be enhanced.

Notably, in the present third exemplary embodiment, rectangular substrate 36 according to the first exemplary embodiment is covered by insulating damping material 66. However, V-shaped substrate 36 according to the second exemplary embodiment may be covered by insulating damping material 66.

OTHER EXEMPLARY EMBODIMENTS

Flow-rate measurement device 10 according to the above first exemplary embodiment employs the "Z-type" configuration in which a pair of ultrasonic transducers 38 is disposed opposite each other. Flow-rate measurement device 10 according to the second exemplary embodiment employs the "V-type" configuration in which one reflection surface 64a is disposed between a pair of ultrasonic transducers 38. On the other hand, other types of configuration may be employed. For example, a "W-type" configuration in which three reflection surfaces 64a are disposed between a pair of ultrasonic transducers 38 may be employed.

In flow-rate measurement devices 10 according to all of the above exemplary embodiments, intermediate flow channel unit 22 is entirely open at the top. On the other hand, intermediate flow channel unit 22 may be partly open at the top. For example, the opening of intermediate flow channel unit 22 is covered by a lid, and an inflow port facing inflow pipe unit 20 and an outflow port facing outflow pipe unit 24 are formed on the lid. In this case, the size between the lid and top plate 26a of measurement flow channel unit 26 stored in intermediate flow channel unit 22 is set to be larger than the thickness of substrate 36. With this, substrate 36 is fixed on top plate 26a of measurement flow channel unit 26, and substrate 36 is covered by the lid. Further, sealing materials 34a and 34b close the gap between the lid and measurement flow channel unit 26, and substrate 36 is disposed between the pair of sealing materials 34a and 34b. Accordingly, sealing materials 34a and 34b prevent gas from flowing over substrate 36, so that the occurrence of troubles of substrate 36 due to gas is prevented.

In flow-rate measurement devices 10 in all of the above exemplary embodiments, positioning holes 52 of substrate 36 and projections 46 on measurement flow channel unit 26 are used as the positioning section for substrate 36. However, the positioning section is not limited to these. For example, first ribs 30a and 30b of measurement flow channel unit 26 can be used as the positioning section. In this case, substrate 36 is disposed on the predetermined position of measurement flow channel unit 26 by bringing the corners of substrate 36 into contact with first ribs 30a and 30b. Further, recesses 62a and 62b and extension parts 60a and 60b of intermediate flow channel unit 22 can be used as the positioning section. In this case, measurement flow channel unit 26 is stored in intermediate flow channel unit 22 such that each of sealing materials 34a and 34b attached to measurement flow channel unit 26 corresponds to each of recesses 62a and 62b. Then, substrate 36 is attached to measurement flow channel unit 26 such that ultrasonic transducers 38 are fitted to extension parts 60a and 60b respectively. Thus, substrate 36 can be positioned relative to measurement flow channel unit 26 through intermediate flow channel unit 22.

In flow-rate measurement devices 10 according to all of the above exemplary embodiments, substrate 36 is directly fixed on measurement flow channel unit 26. On the other hand, substrate 36 may indirectly be fixed on measurement flow channel unit with something being interposed between substrate 36 and measurement flow channel unit 26.

Any of the above-described exemplary embodiments may be combined with each other, so long as the combined exemplary embodiments do not contradict with each other.

From the foregoing description, numerous modifications and other exemplary embodiments of the present invention are obvious to a person skilled in the art. Therefore, the foregoing description should be interpreted only as an example and is provided for the purpose of teaching the best mode for carrying out the present invention to a person skilled in the art. At least one of the structural and/or functional details may be substantially altered without departing from the spirit of the present invention.

INDUSTRIAL APPLICABILITY

Flow-rate measurement device 10 according to the present invention is useful as, for example, flow-rate measurement device 10 that implements enhancement in measurement precision.

REFERENCE MARKS IN THE DRAWINGS 10 flow-rate measurement device
18 fluid flow channel unit 22 intermediate flow channel unit (fluid flow channel unit)
26 measurement flow channel unit
34a, 34b sealing material
35 measurement unit
36 substrate
38 ultrasonic transducer
46 projection (positioning section)
48 terminal
50 measurement circuit
52 positioning hole (positioning section)
56 lead pin
66 insulating damping material
64 reflection section

The invention claimed is:

1. A flow-rate measurement device that measures a flow rate of a fluid flowing through a fluid flow channel unit, the flow-rate measurement device comprising:
   a tubular measurement flow channel unit that is stored in the fluid flow channel unit and has an inside in communication with the fluid flow channel unit;
   a pair of sealing materials that blocks a flow of a fluid and is provided to encircle outer peripheries of the measurement flow channel unit at a first end and a second end of the measurement flow channel unit; and
   a measurement unit including a substrate, on which a measurement circuit is mounted, and a pair of ultrasonic transducers, wherein
   the pair of ultrasonic transducers is electrically and fixedly connected to the substrate in the measurement unit, and the measurement unit is disposed between the pair of sealing materials on the measurement flow channel unit.

2. The flow-rate measurement device according to claim 1, wherein the measurement circuit includes a propagation time measurement unit that measures a time during which the ultrasonic wave propagates between the pair of ultrasonic transducers; and a calculation unit that calculates the flow rate of the fluid based on the time measured by the propagation time measurement unit.

3. The flow-rate measurement device according to claim 1, wherein a positioning section is provided on at least one of the measurement flow channel unit and the substrate.

4. The flow-rate measurement device according to claim 1, further comprising a lead pin connected to the pair of ultrasonic transducers, wherein
   the lead pin is inserted into a hole of the substrate.

5. The flow-rate measurement device according to claim 1, further comprising an insulating damping section covering the substrate.

6. The flow-rate measurement device according to claim 1, wherein the pair of ultrasonic transducers is disposed opposite each other across the measurement flow channel unit.

7. The flow-rate measurement device according to claim 1, further comprising a reflection section fixed to the substrate, wherein
   the pair of ultrasonic transducers is disposed with the measurement flow channel unit being held between the reflection section and the ultrasonic transducers.

8. The flow-rate measurement device according to claim 1, wherein
   the fluid flow channel unit is configured such that an inflow pipe unit, an intermediate flow channel unit, and an outflow pipe unit are sequentially connected,
   the measurement flow channel unit is stored in the intermediate flow channel unit in the fluid flow channel unit, and
   one of the sealing materials is provided to fill between a downstream end of the inflow pipe unit and the outer periphery of the measurement flow channel unit at the first end, while the other sealing material is provided to fill between an upstream end of the outflow pipe unit and the outer periphery of the measurement flow channel unit at the second end.

* * * * *